(12) United States Patent
Chen et al.

(10) Patent No.: US 8,739,998 B2
(45) Date of Patent: Jun. 3, 2014

(54) OUTDOOR TELECOMMUNICATIONS EQUIPMENT ENCLOSURES HAVING SLIDE LOCK ASSEMBLIES

(75) Inventors: Simon Shen-Meng Chen, Palatine, IL (US); Daniel Sedlecky, Naperville, IL (US); Jerome A. Maloney, Sugar Grove, IL (US)

(73) Assignee: Emerson Network Power, Energy Systems, North America, Inc., Warrenville, IL (US)

( * ) Notice: Subject to any disclaimer, the term of this patent is extended or adjusted under 35 U.S.C. 154(b) by 938 days.

(21) Appl. No.: 12/571,989

(22) Filed: Oct. 1, 2009

(65) Prior Publication Data
US 2010/0079041 A1    Apr. 1, 2010

Related U.S. Application Data

(60) Provisional application No. 61/101,923, filed on Oct. 1, 2008.

(51) Int. Cl.
*B65D 6/28*    (2006.01)

(52) U.S. Cl.
USPC ............................. 220/4.02; 220/3.2; 312/100

(58) Field of Classification Search
USPC .......................... 312/100; 220/475, 4.02, 484
See application file for complete search history.

(56) References Cited

U.S. PATENT DOCUMENTS

| | | |
|---|---|---|
| 1,788,118 A | 1/1931 | Meyer |
| 1,853,427 A | 4/1932 | Hollister |
| 3,812,279 A | 5/1974 | Voegeli |
| 4,732,417 A | 3/1988 | Yang |
| 4,866,963 A | 9/1989 | Leininger |
| 5,007,258 A | 4/1991 | Mahaney |
| 5,301,989 A | 4/1994 | Dallmann et al. |
| 5,412,960 A | 5/1995 | James et al. |
| 5,666,830 A | 9/1997 | Litvin |
| 5,722,707 A | 3/1998 | Hosoi |
| 5,902,025 A * | 5/1999 | Yu .................................. 312/109 |
| 6,152,497 A | 11/2000 | Vickers et al. |
| 6,742,365 B1 | 6/2004 | Sullivan et al. |
| 7,357,009 B2 * | 4/2008 | Maloney et al. ................. 70/169 |
| 7,696,431 B2 * | 4/2010 | Chen et al. ....................... 174/38 |
| 2005/0275319 A1 * | 12/2005 | Wittmeier et al. ............. 312/100 |

* cited by examiner

*Primary Examiner* — J. Gregory Pickett
*Assistant Examiner* — Raven Collins
(74) *Attorney, Agent, or Firm* — Harness, Dickey & Pierce, P.L.C.

(57) ABSTRACT

An outdoor telecommunications equipment enclosure includes a dome, a base for receiving the dome, and a slide lock assembly for coupling the dome to the base. The slide lock assembly includes a housing coupled to one of the dome and the base and defining a channel and a slider positioned within the channel. The slider is moveable between a retracted position and an extended position for engaging the other one of the dome and the base. In one example embodiment, one of the slider and the housing includes multiple protrusions in contact with the other one of the slider and the housing. The protrusions inhibit surface contact between the slider and the housing. In another example embodiment, the slide lock assembly includes a gasket, seal and/or plug to inhibit ingress of debris into the slide lock assembly. In yet another example embodiment, the slide lock assembly includes a rotator having an actuator head accessible to a user such that when the rotator is rotated in a first direction via the actuator head, the rotator moves the slider into the extended position.

24 Claims, 9 Drawing Sheets

OUTDOOR TELECOMMUNICATIONS EQUIPMENT ENCLOSURES HAVING SLIDE LOCK ASSEMBLIES

CROSS-REFERENCE TO RELATED APPLICATIONS

This application claims the benefit of U.S. Provisional Application No. 61/101,923, filed on Oct. 1, 2008. The entire disclosure of the above application is incorporated herein by reference.

FIELD

The present disclosure relates to outdoor telecommunications equipment enclosures having slide lock assemblies.

BACKGROUND

This section provides background information related to the present disclosure which is not necessarily prior art.

Outdoor telecommunications enclosures are commonly used in the telecommunications industry to house connections and/or components in an outdoor environment. The outdoor telecommunications equipment enclosures are often employed to distribute telecommunications services, e.g., telephone, television, radio, computer network, internet, etc., to one or more customer locations. When installed in outdoor environments, outdoor telecommunications equipment enclosures are generally required to resist harsh conditions associated with the outdoor environment in order to protect one or more connections and/or components contained therein.

SUMMARY

This section provides a general summary of the disclosure, and is not a comprehensive disclosure of its full scope or all of its features.

According to one aspect of the present disclosure, an outdoor telecommunications equipment enclosure includes a dome, a base for receiving the dome, and a slide lock assembly for coupling the dome to the base. The slide lock assembly includes a housing coupled to one of the dome and the base and defining a channel, and a slider positioned within the channel. The slider is moveable between a retracted position and an extended position for engaging the other one of the dome and the base. One of the slider and the housing includes multiple protrusions in contact with the other one of the slider and the housing. The protrusions inhibit surface contact between the slider and the housing when the slider is moved between the retracted position and the extended position.

According to another aspect of the present disclosure, an outdoor telecommunications equipment enclosure includes a dome, a base for receiving the dome, and a slide lock assembly. The slide lock assembly includes a housing coupled to one of the dome and the base and defining a channel, a slider positioned within the channel, and a slider gasket disposed adjacent to the housing and in contact with the slider to inhibit ingress of debris into the slide lock assembly. The slider is moveable between a retracted position and an extended position for engaging the other one of the dome and the base.

According to yet another aspect of the present disclosure, an outdoor telecommunications equipment enclosure includes a dome, a base for receiving the dome, and a slide lock assembly. The slide lock assembly includes a housing coupled to one of the dome and the base and defining a channel, a slider positioned within the channel, and a rotator. The slider is moveable between a retracted position and an extended position for engaging the other one of the dome and the base. The rotator has an actuator head accessible to a user such that when the rotator is rotated in a first direction via the actuator head, the rotator moves the slider into the extended position.

Further areas of applicability will become apparent from the description provided herein. It should be understood that various aspects of this disclosure may be implemented individually or in combination with one or more other aspects. It should also be understood that the description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "front," "back," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
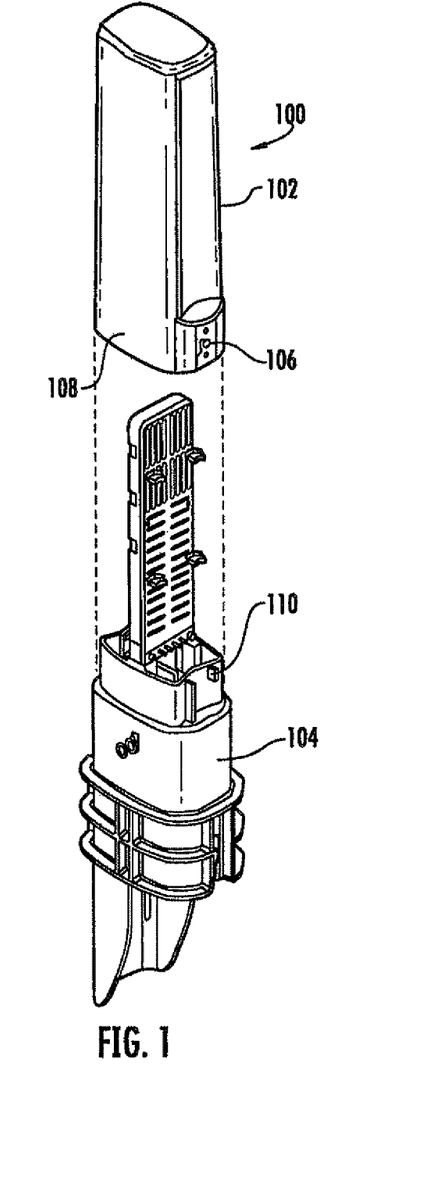
FIG. 1 is an exploded perspective view of an outdoor telecommunications equipment pedestal enclosure according to one example embodiment of the present disclosure.

According to one example embodiment of the present disclosure, an outdoor telecommunications equipment pedestal enclosure is illustrated in FIG. 1 and indicated generally by reference number 100. The outdoor telecommunications equipment pedestal enclosure 100 includes a dome 102, a base 104 for receiving the dome 102, and a slide lock assembly 106 for coupling the dome 102 to the base 104. The dome 102 is substantially monolithic above a lower portion 108 to provide flood protection to one or more connections and/or components housed within the dome 102. The slide lock assembly 106 is coupled to the lower portion 108 of the dome. The base includes a projection 110. The slide lock assembly 106 includes a slider (not shown). When the dome 102 is positioned over the base and lowered (along the dotted line) onto the base 104, the slider engages the projection 110 to secure the dome 102 to the base 104. While the outdoor equipment enclosure illustrated in FIG. 1 is a pedestal enclosure, it should be appreciated that the teachings of the present disclosure may be employed in a variety of outdoor telecommunications equipment enclosures having doors, domes, bases, hoods, covers, and/or other components.

Several example embodiments of slide lock assemblies are described below for purposes of illustration. Various slide lock assemblies may be used in any given application of these teachings. Thus, the teachings of the present disclosure are not limited to the specific examples described below.

Figure 2:
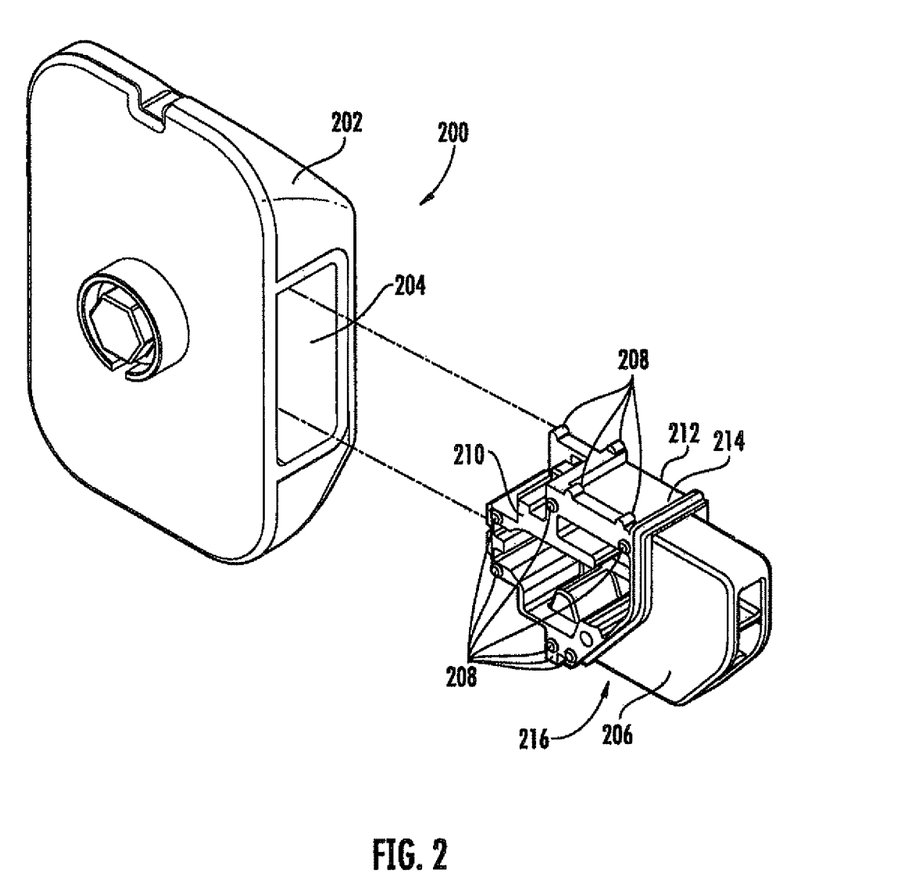
FIG. 2 is an exploded perspective view of an example embodiment of a slide lock assembly including a slider having multiple protrusions.

FIG. 2 illustrates a slide lock assembly 200 according to one example embodiment. The assembly 200 includes a housing 202 defining a channel 204 and a slider 206 positioned within the channel 204. The slider 206 is moveable between a retracted position and an extended position. The slider 206 includes multiple protrusions 208 for contacting internal surfaces of the housing 202. Contact between the multiple protrusions 208 and the housing 202 inhibit surface contact between the slider 206 and the housing 202. In this manner, debris may be disposed in or fall through spaces between the housing 202 and the slider 206 without substantially affecting movement of the slider 206 relative to the housing 202. It should be appreciated that protrusions may be included on one or both of a slider and a housing in other embodiments to limit or reduce surface contact between the housing and the slider.

The slider 206 includes four surfaces 210-216, each including at least one of the multiple protrusions 208. The front and back surfaces 210, 212 each include six protrusions 208. The top surface 214 includes four protrusions 208, and the bottom surface 216 includes two protrusions 208. A different number and/or configuration (e.g., size, shape, etc.) of protrusions may be employed in other embodiments.

Figure 3:
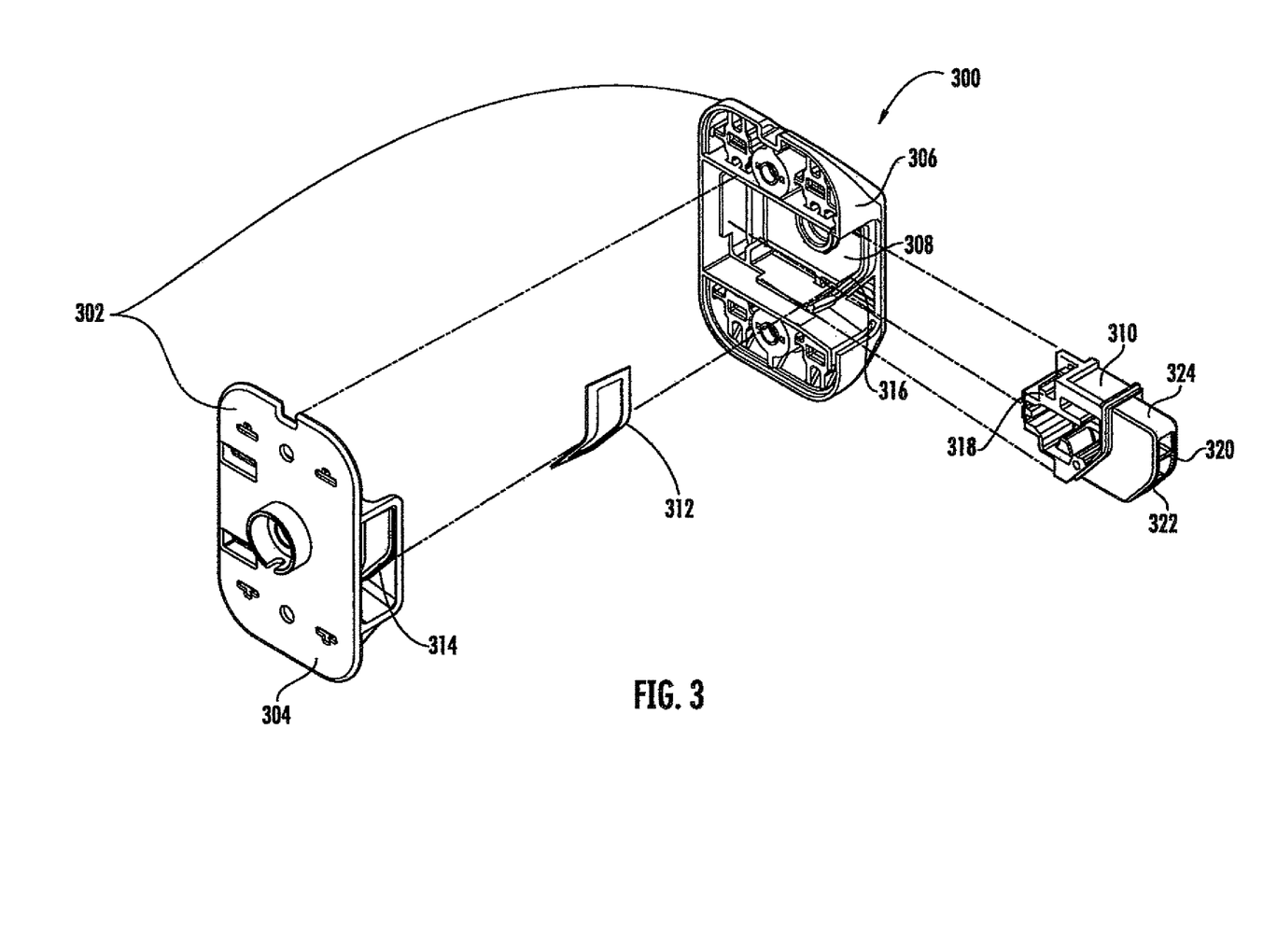
FIG. 3 is an exploded perspective view of another example embodiment of a slide lock assembly having a slider gasket.

FIG. 3 illustrates a slide lock assembly 300 according to another example embodiment. The assembly 300 includes a housing 302 having a cover 304 and a lock base 306. The cover 304 and the lock base 306 define a channel 308. The slide lock assembly 300 includes a slider 310 positioned within the channel 308 and a slider gasket 312 disposed adjacent to the housing 302 and in contact with the slider 310 to inhibit ingress of debris (e.g., mud, dirt, sand, water, particulates, etc.) into the slide lock assembly 300. The slider 310 is moveable between a retracted position and an extended position.

The slider gasket 312 is a silicone gasket in this example embodiment. One or more elastomeric materials (e.g., rubber, etc.) or other non-elastomeric materials may be used in other embodiments. When assembled, the slider gasket 312 is retained between the cover 304 and the lock base 306. The cover 304 and the lock base 306 include surfaces 314, 316, respectively, shaped to hold the slider gasket 312 in contact with the outer periphery of the slider 310. If debris settles on a distal end of the slider 310 while in the extended position, the slider gasket 312 displaces the debris from the slider 310, as the slider 310 is moved into the retracted position. In this manner, the slider gasket 312 inhibits transport of debris into the slide lock assembly 300. It should be appreciated that in other embodiments, one or both of the cover and the lock base may be otherwise configured to hold the slider gasket against the slider. Alternatively, a single-piece housing may be used and include a surface shaped to hold a slider gasket in contact with surfaces of a slider.

The slider 310 includes a proximal end 318 and a distal end 320. The proximal end 318 is positioned within the channel 308. The distal end 320 is configured to engage a projection (or cavity) included on a dome, a base or other portions of an outdoor telecommunications equipment enclosure. For example, the distal end of the slider may engage the projection 110 included on the base 104 in FIG. 1.

In the embodiment of FIG. 3, the distal end 320 generally defines a ramp surface 322. When the ramp surface 322 engages a projection (or cavity), the projection (or cavity) gradually biases the slider 310 into the retracted position. Once the slider 310 passes the projection (or cavity), the slider 310 automatically returns to the extended position. After returning to the extended position, a top surface 324 of the distal end 320 generally contacts the projection (or cavity) such that the dome is not removable from the base unless acted upon by another force (as described below). It should be appreciated that a ramp surface and/or a top surface of a slider having a different configuration (e.g., size, shape, angle, etc.) may be employed in different embodiments, possibly depending on a configuration of a projection (or cavity) to be contacted by the slider.

As shown, the slider gasket 312 defines a profile having substantially the same shape as the ramp surface 322 of the slider 310. In this manner, the slider gasket 312 maintains contact around a perimeter of the slider 310, regardless of whether the slider 310 is the retracted positioned, the extended position, or another position therebetween. Additionally, surfaces 314, 316 are shaped substantially the same as the distal end 320 of the slider 310 to effectively hold the slider gasket 312 in contact with an outer periphery the slider 310, regardless of the position of the slider 310. Different configurations of slider gaskets and/or surfaces may be used in other slide lock assembly embodiments. The configuration of a slider may dictate a configuration of a slider gasket and/or a surface.

Figure 4:
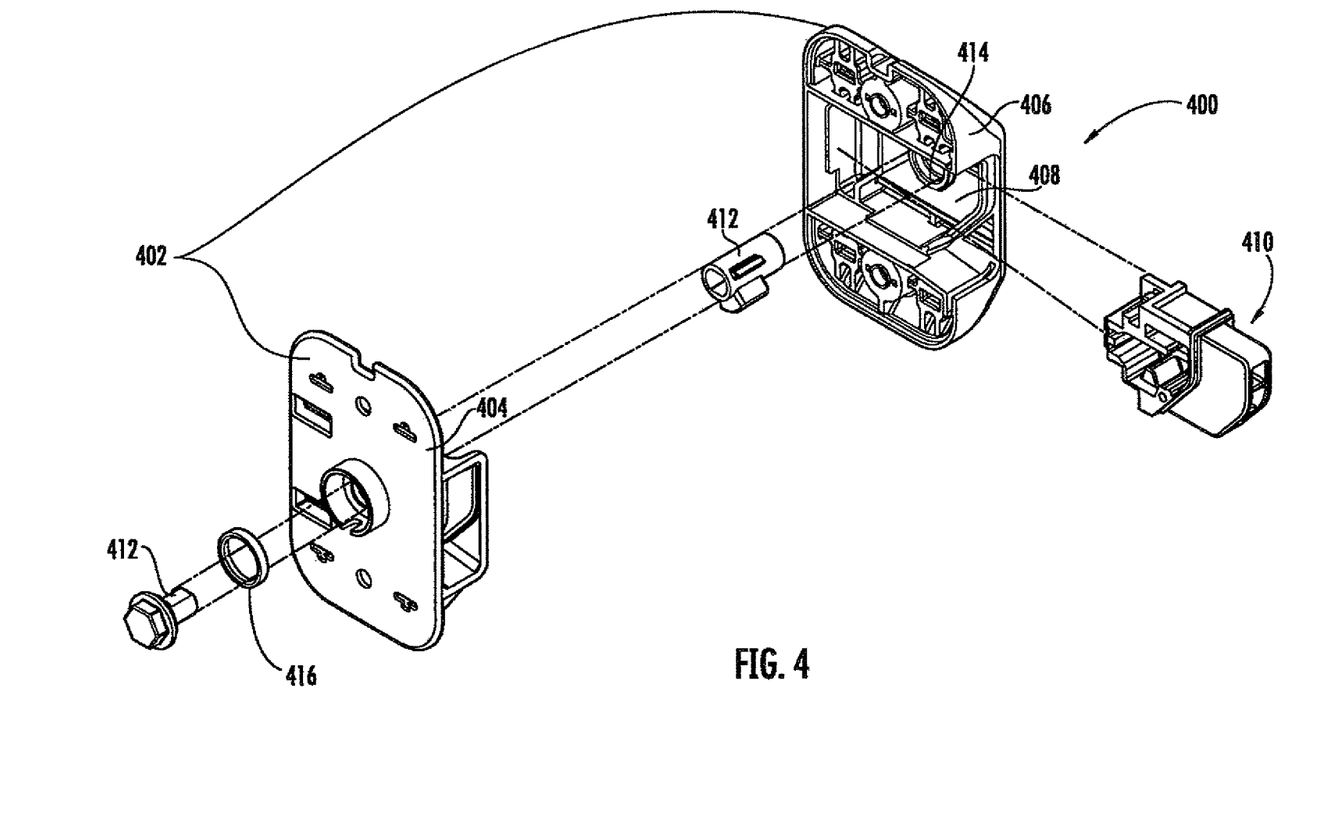
FIG. 4 is an exploded perspective view of another example embodiment of a slide lock assembly having a rotator seal.

FIG. 4 illustrates a slide lock assembly 400 according to another example embodiment. The assembly 400 includes a housing 402 having a cover 404 and a lock base 406. The cover 404 and lock base 406 define a channel 408. The slide lock assembly 400 includes a slider 410 positioned within the channel 408 and a rotator 412 extending through the cover 404 for moving the slider 410 into an extended position. In this particular embodiment, the rotator 412 includes a two-piece construction. The lock base 406 includes a receptacle 414 to receive the rotator 412. The slide lock assembly 400 also includes a rotator seal 416 disposed adjacent to the rotator 412, when assembled, to resist ingress of debris into the slide lock assembly 400. In this example, the rotator seal 416 is an elastomeric O-ring. Other shapes/types/sizes of rotator seal made from other types of materials (e.g., rubber, silicon, etc.) may be employed. Alternately, a rotator seal may be omitted.

Figure 5:
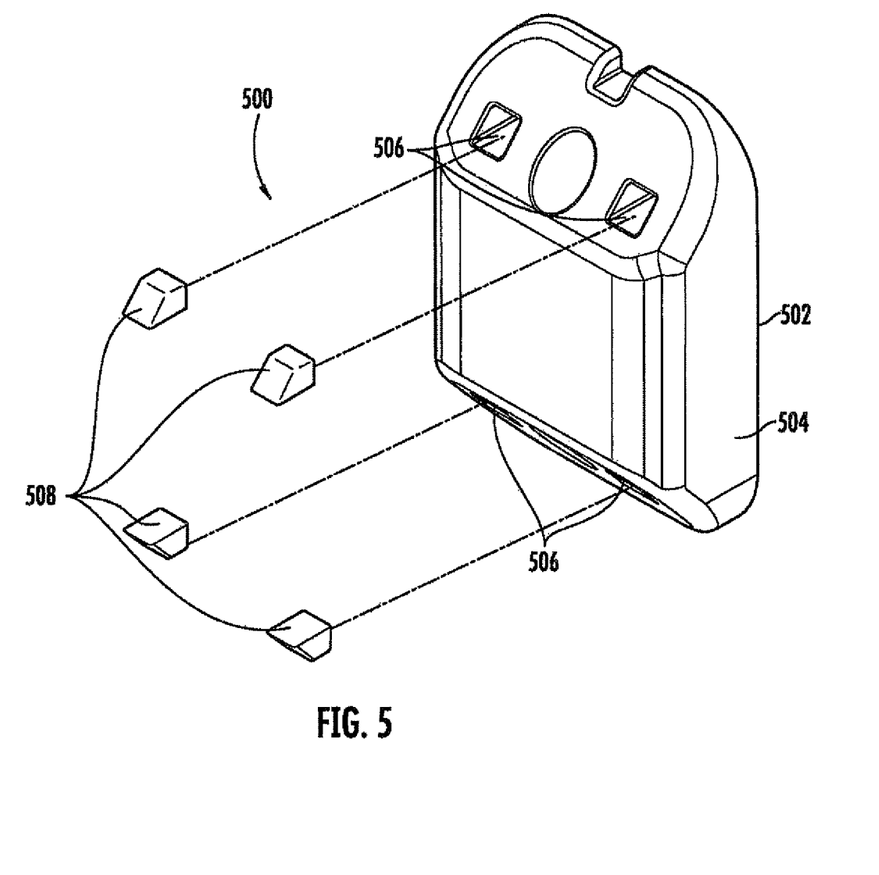
FIG. 5 is an exploded perspective view of an example embodiment of a slide lock assembly having multiple plugs.

FIG. 5 illustrates a slide lock assembly 500 according to another example embodiment. The assembly 500 includes a cover 502 and a lock base 504. Each of the cover 502 and the base 504 are single molded elements made from one or more suitable resins. The cover 502 and the lock base 504 are coupled to one another via four snap-fit fasteners (integrally formed with the cover 504). An opening 506 in the lock base 504 is associated with each of the fasteners. After the cover 502 and lock base 504 are snapped together, four rubber plugs 508 are inserted into openings 506, to form an interference fit and seal the openings 506 to prevent ingress of debris.

Other types and shapes of plugs may be employed in other embodiments, depending on the particular size, number, and/or type of fasteners used to couple the cover to the lock base. Plugs may be made from one or more of rubber, silicone, or other materials, etc. In one example embodiment, plugs and fasteners may be omitted, due to a single-piece construction of the housing.

When a housing includes a cover and a lock base, various types of fasteners (integrally formed or otherwise) may also be provided to coupled the cover to the lock base, e.g., as snap-fits, screws, rivets, bolts, nails, adhesive, welds, other mechanical fasteners, etc. Fasteners may be self-sealing or non self-sealing.

Figure 6:
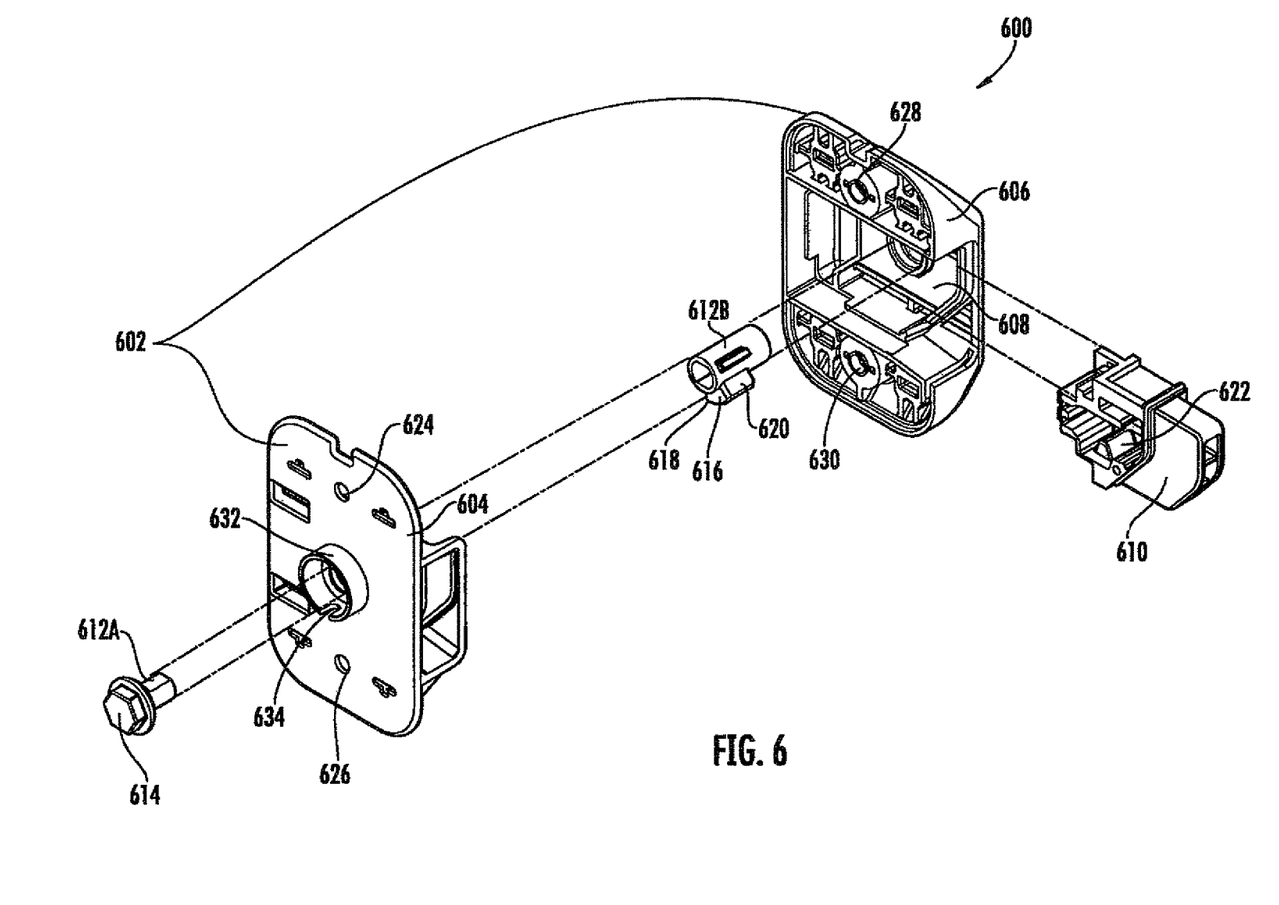
FIG. 6 is an exploded perspective view of another example embodiment of a slide lock assembly having a rotator for moving a slider into an extended position.

FIG. 6 illustrates a slide lock assembly 600 according to another example embodiment. The assembly 600 includes a housing 602 having a cover 604 and a lock base 606. The cover 604 and lock base 606 define a channel 608. The slide lock assembly 600 includes a slider 610 positioned within the channel 608 and a rotator 612 extending at least partially through the housing 602. The rotator 612 includes a rotator collar 612A and a rotator base 612B. The rotator collar 612A includes an actuator head 614 accessible to a user. The rotator 612 may be rotated in a first direction, via the actuator head 614, to move the slider 610 into an extended position. In this manner, a user may be able to force the slider 610 into the extended position, even if the slider 610 is jammed in the retracted position due to debris, etc. When the rotator 612 is rotated in a second direction, the rotator 612 moves the slider 610 into the retracted position. In this manner, a user may forcibly disengage the slider 610 from a projection (or cavity) and remove the dome from the base.

As shown in FIG. 6, the actuator head 614 includes a hex head. It should be appreciated, however, that a different type of actuator head may be employed in other embodiments. In one example, an actuator head may define a non-standard, special, and/or proprietary shape, such that a special tool provided by a manufacturer may be required to efficiently rotate the actuator head.

The rotator base 612B includes a tab 616 having a generally trapezoidal shape. The tab 616 defines a sleeve having ends 618, 620. The slider 610 includes a raised portion 622, to be positioned in the sleeve of the tab 616. End 618 contacts the raised portion 622 to move the slider 610 into the extended position, and end 620 contacts the raised portion 622 to move the slider 610 into the retracted position. Alternatively, the rotator may include a different tab configuration for moving the slider into the retracted position and/or the extended position.

If the slide lock assembly 600 is used in a pedestal enclosure with the slide lock assembly 600 coupled to the dome, the actuator head 614 extends through the dome to provide access to the user. The cover 604 includes two holes 624, 626 each for receiving a self-sealing fastener for coupling the slide lock assembly 600 to the dome. The fasteners generally extend through the cover 604 and into holes 628, 630 of the lock base 606, thereby sealing holes 624-30. Additionally, the cover 604 includes a shroud 632 that extends through an opening in the dome, when the slide lock assembly 600 is coupled to the dome. The shroud 632 includes a drain groove 634 to resist a build-up of debris around the actuator head 614 and to ensure access to the actuator head 614. In other embodiments, a different shroud configuration may be employed—with or without a drain groove—to protect the actuator head and/or resist access by unauthorized users. Alternatively, the shroud may be omitted.

A slide lock assembly 700 according to yet another example embodiment is illustrated in FIGS. 7-10. The slide lock assembly 700 is configured to inhibit ingress of debris having particles sizes ranging from about 0.001 inches to about 0.030 inches—or larger. It should, however, be appreciated that other embodiments may include one or more features disclosed herein, alone or in combination, to inhibit ingress of debris of various particles sizes.

The slide lock assembly 700 includes a housing 702 having a cover 704 and a lock base 706. The cover 704 includes several integral fasteners 726 for coupling the lock base 706 to the cover 704 via snap engagement. A slider 708 includes multiple protrusions 714, and housing 702 includes complimentary rails 716. The rails 716 are adapted to receive therebetween multiple protrusions 714 included on a back surface 718 of the slider 708. The rails 716 guide movement of the multiple protrusions 714 to efficiently transition the slider 708 between the retracted position and the extended position. A different combination of protrusions and rails may be included on the slider and/or the housing in other slide lock assemblies. Alternatively, the complimentary rails may be omitted.

Figure 7:
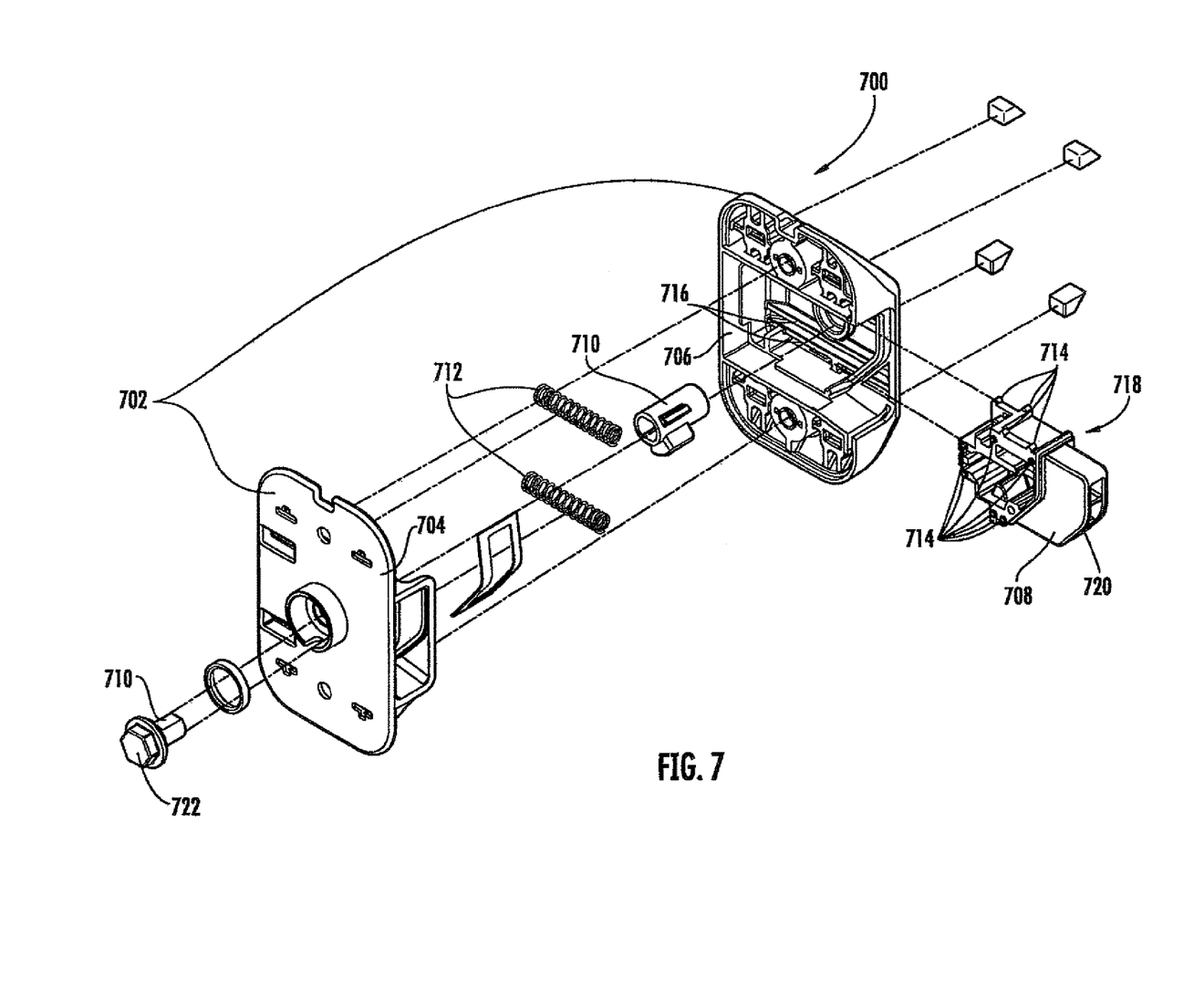
FIG. 7 is a front exploded perspective view of a slide lock assembly according to yet another example embodiment of the present disclosure.
Figure 8:
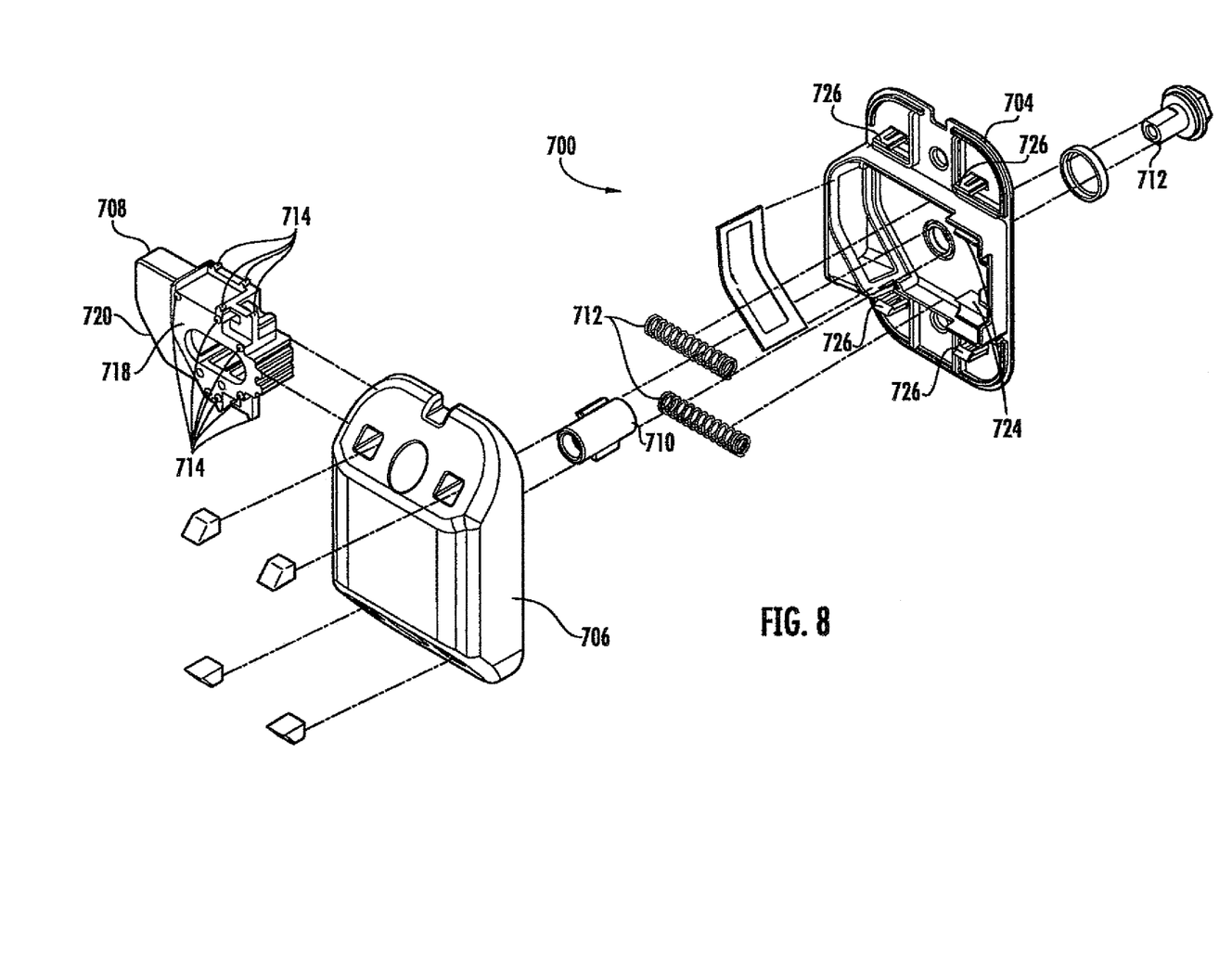
FIG. 8 is a rear exploded perspective view of the slide lock assembly of FIG. 7.
Figure 9:
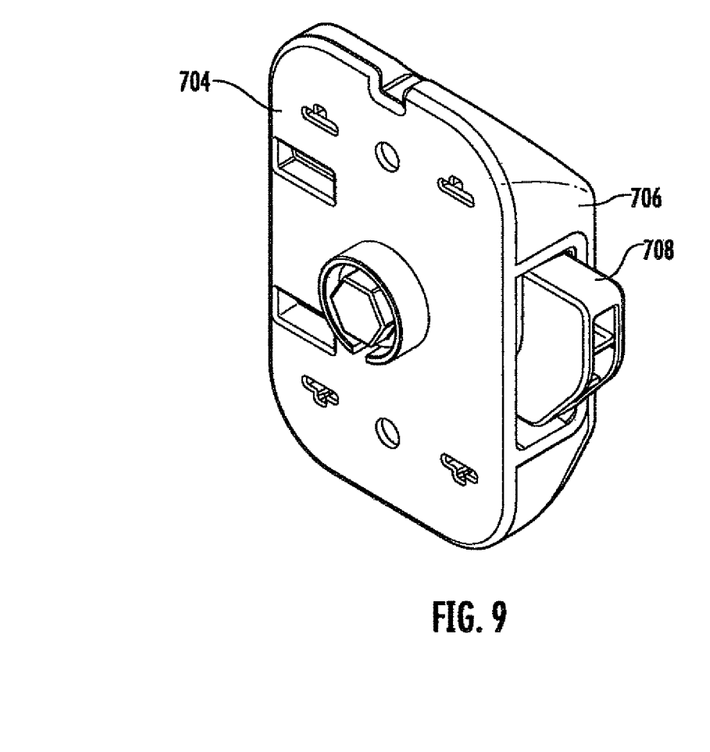
FIG. 9 is a front perspective view of the slide lock assembly of FIG. 7.

As shown in FIGS. 7-8, the slide lock assembly 700 includes two springs 712 for biasing the slider 708 into the extended position. When the slide lock assembly 700 is installed in a pedestal enclosure and the dome is lowered onto the base, a projection (or cavity) contacts a ramp surface 720 of the slider 708, biasing the slider 708 and compressing the springs 712 into the retracted position. When the projection (or cavity) moves beyond the slider 708, the springs 712 bias the slider 708 to automatically move the slider 708 into the extended position. In this manner, the slide lock assembly 700 provides for self-locking of the dome and base, such that manually locking the dome and the base may not be necessary. Conversely, to remove the dome, a user may rotate the rotator 710 via actuator head 722 to compress the springs 712 and cause the slider 708 to move into the retracted position. When the slider 708 is in the retracted position, the user may lift the dome off the base. In the particular embodiment of FIGS. 7-8, the springs 712 are disposed between the cover 704 and the lock base 706. In other embodiments, other types of biasing members may be employed to bias the slider into an extended and/or retracted position. Alternatively, the biasing member(s) may be omitted.

Referring to FIG. 8, the cover 704 includes two pocket ribs 724. The pocket ribs 724 contact and guide compression of the springs 712. It should be appreciated that other configurations and numbers of pocket ribs may be employed in other embodiments, possibly depending on the type or configuration of biasing member or the configuration of the housing. Alternatively, pocket ribs may be omitted.

Figure 10:
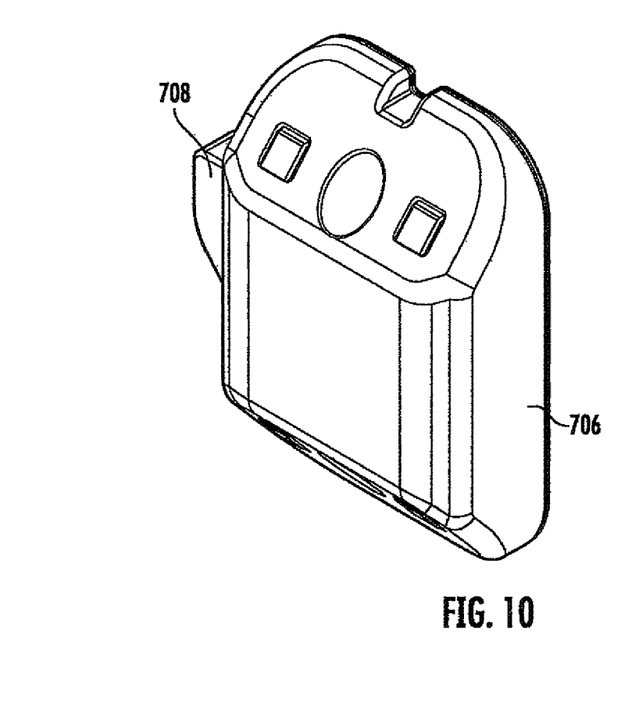
FIG. 10 is a rear perspective view of the slide lock assembly of FIG. 7.

Referring to FIG. 10, the lock base 706 includes a smooth exterior surface such that substantially all corners and edges are rounded. When the slide lock assembly 700 is coupled to a dome, the lock base 706 presents the smooth surface to any wires, cables, and/or fibers within the enclosure. In this manner, when the dome is installed on the base, the slide lock assembly 700 may pass by such wires, cables, and/or fibers without snagging.

The foregoing description of the example embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

What is claimed is:

1. An outdoor telecommunications equipment enclosure comprising a dome, a base for receiving the dome, and a slide lock assembly for coupling the dome to the base, the slide lock assembly including a housing coupled to one of the dome and the base and defining a channel, and a slider positioned within the channel, the slider being moveable between a retracted position and an extended position for engaging the other one of the dome and the base, one of the slider and the housing including multiple protrusions in contact with the other one of the slider and the housing, the other one of the slider and the housing including at least one rail complimentary to at least one of the multiple protrusions for guiding movement of the at least one of the multiple protrusions, the slider including a proximate end, a distal end, and side surfaces extending between the proximate end and the distal end, the housing including side surfaces and a rear surface, the proximate end of the slider positioned adjacent the rear surface of the housing when the slider is in the retracted position, the multiple protrusions on one of the side surfaces of one of the slider and the housing, the protrusions inhibiting surface contact between the side surfaces of the slider and the housing when the slider is moved between the retracted position and the extended position.

2. The outdoor telecommunications equipment enclosure of claim 1 wherein at least two side surfaces of the slider are adjacent to the housing, the at least two surfaces including at least one of the multiple protrusions.

3. The outdoor telecommunications equipment enclosure of claim 1 wherein the slide lock assembly includes a rotator that is rotatable relative to the housing for moving the slider into the extended position.

4. The outdoor telecommunications equipment enclosure of claim 3 wherein the slide lock assembly includes a rotator seal disposed adjacent to the rotator.

5. The outdoor telecommunications equipment enclosure of claim 1 wherein the slide lock assembly includes a slider gasket disposed adjacent to the slider to inhibit ingress of debris into the slide lock assembly.

6. The outdoor telecommunications equipment enclosure of claim 5 wherein the housing includes a lock base and a cover coupled to the lock base via at least one fastener.

7. The outdoor telecommunications equipment enclosure of claim 6 wherein at least one of the cover and the base includes a surface in contact with the slider gasket, the surface defining a shape to hold the slider gasket in contact with the slider.

8. The outdoor telecommunications equipment enclosure of claim 5 wherein the distal end of the slider is configured to engage the other one of the dome and the base, the distal end defining a ramp surface.

9. The outdoor telecommunications equipment enclosure of claim 8 wherein the slider gasket includes a profile, the profile defining a shape substantially complimentary to the ramp surface.

10. The outdoor telecommunications equipment enclosure of claim 6 wherein the slide lock assembly includes multiple plugs and multiple fasteners, each plug substantially sealing an opening associated with one of the multiple fasteners.

11. An outdoor telecommunications equipment enclosure comprising a dome, a base for receiving the dome, and a slide lock assembly including a housing coupled to one of the dome and the base and defining a channel, a slider positioned within the channel, the slider being moveable between a retracted position and an extended position for engaging the other one of the dome and the base, and a slider gasket disposed adjacent to the housing and in contact with the slider to inhibit ingress of debris into the slide lock assembly.

12. The outdoor telecommunications equipment enclosure of claim 11 wherein the slider defines a ramp surface.

13. The outdoor telecommunications equipment enclosure of claim 12 wherein the slider gasket defines a profile having substantially complimentary to the ramp surface of the slider.

14. The outdoor telecommunications equipment enclosure of claim 11 wherein the slide lock assembly includes a rotator extending through at least a portion of the housing and having an actuator head accessible to a user such that when the rotator is rotated in a first direction via the actuator head, the rotator moves the slider into the retracted position.

15. The outdoor telecommunications equipment enclosure of claim 14 wherein the slide lock assembly includes a rotator seal disposed adjacent to the rotator to resist ingress of debris into the slide lock assembly.

16. The outdoor telecommunications equipment enclosure of claim 14 wherein the rotator is rotatable in a second direction via the actuator head to move the slider into the extended position.

17. The outdoor telecommunications equipment enclosure of claim 16, wherein the slide lock assembly includes a biasing member for biasing the slider into the extended position.

18. The outdoor telecommunications equipment enclosure of claim 17, wherein the biasing member includes a plurality of springs, the housing including a plurality of pocket ribs, each of the pocket ribs for guiding compression of one of the springs.

19. The outdoor telecommunications equipment enclosure of claim 11 wherein the housing includes a cover and a lock base coupled to the cover via at least one fastener.

20. The outdoor telecommunications equipment enclosure of claim 11 wherein one of the slider and the housing includes multiple protrusions in contact with the other one of the slider and the housing to inhibit surface contact between the slider and the housing when the slider is moved between the retracted position and the extended position.

21. An outdoor telecommunications equipment enclosure comprising a dome, a base for receiving the dome, and a slide lock assembly for coupling the dome to the base, the slide lock assembly including a housing coupled to one of the dome and the base and defining a channel, a slider positioned within the channel, and a rotator, the slider being moveable between a retracted position and an extended position for engaging the other one of the dome and the base, the rotator rotatable relative to the housing for moving the slider into the extended position, one of the slider and the housing including multiple protrusions in contact with the other one of the slider and the housing, the slider including a proximate end, a distal end, and side surfaces extending between the proximate end and the distal end, the housing including side surfaces and a rear surface, the proximate end of the slider positioned adjacent the rear surface of the housing when the slider is in the retracted position, the multiple protrusions on one of the side surfaces of one of the slider and the housing, the protrusions inhibiting surface contact between the side surfaces of the slider and the housing when the slider is moved between the retracted position and the extended position.

22. The outdoor telecommunications equipment enclosure of claim 21 wherein the slide lock assembly includes a rotator seal disposed adjacent to the rotator.

23. The outdoor telecommunications equipment enclosure of claim 21 wherein the slide lock assembly includes a slider gasket disposed adjacent to the slider to inhibit ingress of debris into the slide lock assembly.

24. The outdoor telecommunications equipment enclosure of claim 23 wherein the housing includes a lock base and a cover coupled to the lock base via at least one fastener and wherein at least one of the cover and the base includes a surface in contact with the slider gasket, the surface defining a shape to hold the slider gasket in contact with the slider.

* * * * *

UNITED STATES PATENT AND TRADEMARK OFFICE
CERTIFICATE OF CORRECTION

| | | |
|---|---|---|
| PATENT NO. | : 8,739,998 B2 | Page 1 of 1 |
| APPLICATION NO. | : 12/571989 | |
| DATED | : June 3, 2014 | |
| INVENTOR(S) | : Chen et al. | |

It is certified that error appears in the above-identified patent and that said Letters Patent is hereby corrected as shown below:

In the Specification

In column 6, line 17, replace "6128" with "612B."

Signed and Sealed this
Twenty-sixth Day of August, 2014

Michelle K. Lee
*Deputy Director of the United States Patent and Trademark Office*